(12) United States Patent
Rodriguez

(10) Patent No.: US 10,652,318 B2
(45) Date of Patent: May 12, 2020

(54) SYSTEMS AND METHODS FOR LOAD BALANCING USING PREDICTIVE ROUTING

(75) Inventor: John Ernest Rodriguez, Capitola, CA (US)

(73) Assignee: VERISIGN, INC., Reston, VA (US)

(*) Notice: Subject to any disclaimer, the term of this patent is extended or adjusted under 35 U.S.C. 154(b) by 379 days.

(21) Appl. No.: 13/572,848

(22) Filed: Aug. 13, 2012

(65) Prior Publication Data

US 2014/0047104 A1 Feb. 13, 2014

(51) Int. Cl.
*H04L 29/08* (2006.01)
*H04L 29/12* (2006.01)

(52) U.S. Cl.
CPC ...... *H04L 67/1008* (2013.01); *H04L 61/1511* (2013.01); *H04L 67/1023* (2013.01); *H04L 67/1029* (2013.01); *H04L 67/28* (2013.01)

(58) Field of Classification Search
CPC . H04L 67/1002; H04L 67/02; H04L 67/1008; H04L 67/101; H04L 67/1021; H04L 67/28; H04L 67/1023; H04L 67/1029; H04L 47/122; H04L 47/125; H04L 47/127; H04L 61/1511; H04L 45/00; H04L 67/1012; H04L 67/1019; H04L 29/12066; H04L 45/123; H04L 47/10; H04L 65/80; H04L 67/1017; H04L 67/327; H04L 67/42; H04L 12/2869; H04L 12/287; H04L 1/0018; H04L 1/1685; H04L 29/06; H04L 29/08144; H04L 29/12811; H04L 41/14; H04L 41/147; H04L 43/0829;

(Continued)

(56) References Cited

U.S. PATENT DOCUMENTS 6,178,160 B1  1/2001 Bolton et al.
6,950,848 B1* 9/2005 Yousefi'zadeh .......... G06F 9/50
                                                    707/999.01

(Continued)

FOREIGN PATENT DOCUMENTS

EP       2216762 A2    8/2010
WO    2001042908 A2    6/2001

OTHER PUBLICATIONS

Parinaz Haratian ; Faramarz Safi-Esfahani ; Leili Salimian ; Akbar Nabiollahi,—An Adaptive and Fuzzy Resource Management Approach in Cloud Computing, IEEE Transactions on Cloud Computing , Aug. 3, 2017.*

(Continued)

*Primary Examiner* — Greg C Bengzon
(74) *Attorney, Agent, or Firm* — Artegis Law Group, LLP

(57) ABSTRACT

Systems and methods are disclosed for routing requests for information based on predictive data. The systems and methods may receive measurement data indicative of states of each of a plurality of destination servers, and generate predicted measurement data values for each of the plurality of destination servers based on the retrieved measurement data. The predicted measurement data values may represent predicted states of each of the destination servers at a time later than a time corresponding to the received measurement data. The systems and methods may also receive requests for information from a client computer, and route the received requests for information to one of the plurality of destination servers based on the predicted measurement data value.

22 Claims, 5 Drawing Sheets

(58) Field of Classification Search
CPC ..... H04L 43/0864; H04L 43/10; H04L 43/12;
H04L 45/02; H04L 45/12; H04L 45/122;
H04L 45/18; H04L 45/22; H04L 45/24;
H04L 45/28; H04L 45/302; H04L 45/306;
H04L 45/44; H04L 47/14; H04L 47/25;
H04L 47/283; H04L 47/70; H04L 47/76;
H04L 47/781; H04L 47/823; H04L
47/826; H04L 49/25; H04L 49/3009;
H04L 61/6009; H04L 65/1006; H04L
65/1073; H04L 67/10; H04L 67/1034;
H04L 67/1036; H04L 67/1038; H04L
67/14; H04L 67/16; H04L 67/18; H04L
67/2814; H04L 67/2842; H04L 67/289;
H04L 69/40; G06F 17/30867; G06F
9/505; G06F 9/5077; G06F 9/5083; G06F
2209/5019; G06F 2209/5022; G06F
2209/508; G06F 9/06; G06F 9/50; G06F
9/5088; H04W 40/02; H04W 40/10;
H04W 40/12; H04W 40/18; H04W
40/246; H04W 40/248; H04W 40/28;
H04W 40/30; H04W 84/18; H04W 28/26;
H04W 40/06; H04W 40/08; H04W 40/20;
H04W 40/22; H04W 40/26; G06Q 10/00;
G06Q 50/18
USPC .......... 709/224, 226, 223, 203, 217
See application file for complete search history.

(56) References Cited

U.S. PATENT DOCUMENTS

| | | | | |
|---|---|---|---|---|
| 6,986,139 | B1* | 1/2006 | Kubo | G06F 9/505 |
| | | | | 709/223 |
| 7,062,556 | B1* | 6/2006 | Chen | G06F 9/505 |
| | | | | 709/201 |
| 7,111,074 | B2 | 9/2006 | Basturk | |
| 7,184,945 | B1 | 2/2007 | Takahashi et al. | |
| 7,187,652 | B2* | 3/2007 | Lee | H04L 45/24 |
| | | | | 370/238 |
| 7,231,445 | B1* | 6/2007 | Aweya et al. | 709/226 |
| 7,382,765 | B2 | 6/2008 | Kennedy et al. | |
| 7,685,099 | B2* | 3/2010 | Liu | G06F 16/951 |
| | | | | 706/8 |
| 7,685,100 | B2* | 3/2010 | Liu | G06Q 30/02 |
| | | | | 706/8 |
| 7,689,622 | B2* | 3/2010 | Liu | G06F 16/951 |
| | | | | 707/751 |
| 7,693,823 | B2* | 4/2010 | Liu | G06F 16/951 |
| | | | | 706/8 |
| 7,716,022 | B1* | 5/2010 | Park | G06Q 10/10 |
| | | | | 702/181 |
| 7,734,815 | B2 | 6/2010 | Leighton et al. | |
| 7,783,510 | B1* | 8/2010 | Gilgur | G06Q 10/00 |
| | | | | 705/7.25 |
| 8,036,224 | B2 | 10/2011 | Axelsson et al. | |
| 8,037,186 | B2* | 10/2011 | Dumitriu et al. | 709/226 |
| 8,050,671 | B2 | 11/2011 | Calin et al. | |
| 8,225,119 | B2* | 7/2012 | Jain | G06F 9/5094 |
| | | | | 713/320 |
| 8,352,607 | B2* | 1/2013 | Dias | H04L 29/06 |
| | | | | 370/241 |
| 8,468,247 | B1* | 6/2013 | Richardson | H04L 67/18 |
| | | | | 370/329 |
| 8,495,170 | B1* | 7/2013 | Vosshall et al. | 709/217 |
| 8,499,066 | B1* | 7/2013 | Zhang | H04L 47/823 |
| | | | | 709/223 |
| 8,510,807 | B1* | 8/2013 | Elazary | G06F 9/541 |
| | | | | 709/217 |
| 9,497,136 | B1* | 11/2016 | Ramarao | G06F 9/45558 |
| 2002/0073199 | A1* | 6/2002 | Levine | H04L 29/12066 |
| | | | | 709/225 |
| 2002/0078237 | A1* | 6/2002 | Leighton | H04L 29/12066 |
| | | | | 709/239 |
| 2002/0124080 | A1* | 9/2002 | Leighton | H04L 29/06 |
| | | | | 709/224 |
| 2002/0129134 | A1* | 9/2002 | Leighton | H04L 29/12009 |
| | | | | 709/223 |
| 2002/0165958 | A1* | 11/2002 | Duffield | H04L 12/14 |
| | | | | 709/224 |
| 2002/0188710 | A1* | 12/2002 | Duffield | H04L 41/0896 |
| | | | | 709/223 |
| 2003/0009399 | A1* | 1/2003 | Boerner | G06F 17/18 |
| | | | | 705/35 |
| 2004/0103194 | A1* | 5/2004 | Islam | G06F 9/505 |
| | | | | 709/225 |
| 2004/0111509 | A1* | 6/2004 | Eilam | H04L 67/1008 |
| | | | | 709/224 |
| 2004/0122950 | A1* | 6/2004 | Morgan | G06F 9/5083 |
| | | | | 709/226 |
| 2004/0143664 | A1* | 7/2004 | Usa | G06F 9/5077 |
| | | | | 709/226 |
| 2004/0165531 | A1* | 8/2004 | Brady | H04L 41/147 |
| | | | | 370/236 |
| 2005/0278703 | A1* | 12/2005 | Lo | G06F 11/0709 |
| | | | | 717/126 |
| 2006/0230158 | A1* | 10/2006 | Fukazawa | H04L 67/2895 |
| | | | | 709/228 |
| 2007/0016666 | A1* | 1/2007 | Duffield | H04L 12/14 |
| | | | | 709/223 |
| 2007/0300239 | A1* | 12/2007 | Adam | G06F 9/505 |
| | | | | 719/320 |
| 2008/0071925 | A1* | 3/2008 | Leighton | H04L 29/12066 |
| | | | | 709/241 |
| 2009/0089078 | A1* | 4/2009 | Bursey | H04W 4/70 |
| | | | | 705/300 |
| 2009/0094361 | A1* | 4/2009 | Srinivasan | 709/224 |
| 2009/0328050 | A1* | 12/2009 | Liu | G06F 9/5088 |
| | | | | 718/104 |
| 2010/0017239 | A1* | 1/2010 | Saltzman | G06Q 10/00 |
| | | | | 705/7.31 |
| 2010/0030896 | A1* | 2/2010 | Chandramouli | G06F 16/24568 |
| | | | | 709/224 |
| 2010/0076725 | A1* | 3/2010 | Chen | G05B 19/4184 |
| | | | | 702/179 |
| 2010/0115327 | A1* | 5/2010 | Lee | G06F 9/5083 |
| | | | | 714/4.4 |
| 2010/0229178 | A1* | 9/2010 | Ito | G06F 9/5083 |
| | | | | 718/104 |
| 2010/0306373 | A1* | 12/2010 | Wormley | 709/224 |
| 2011/0047554 | A1* | 2/2011 | Lakshmanan | G06F 9/5088 |
| | | | | 718/105 |
| 2011/0047555 | A1* | 2/2011 | Lakshmanan | G06F 9/5088 |
| | | | | 718/105 |
| 2011/0051602 | A1* | 3/2011 | Matthews | H04L 45/00 |
| | | | | 370/235 |
| 2011/0058498 | A1* | 3/2011 | Miyoshi | H04L 45/00 |
| | | | | 370/253 |
| 2011/0126206 | A1* | 5/2011 | Kato | G06F 1/206 |
| | | | | 718/103 |
| 2011/0153828 | A1* | 6/2011 | Park | G06F 9/505 |
| | | | | 709/226 |
| 2011/0176421 | A1 | 7/2011 | Perlmutter et al. | |
| 2012/0004890 | A1* | 1/2012 | Chen | G05B 19/4184 |
| | | | | 702/181 |
| 2012/0020216 | A1* | 1/2012 | Vashist | H04L 41/14 |
| | | | | 370/235 |
| 2012/0083917 | A1* | 4/2012 | Zhou | G05B 13/048 |
| | | | | 700/110 |
| 2012/0117226 | A1* | 5/2012 | Tanaka | H04L 41/0266 |
| | | | | 709/224 |
| 2012/0131180 | A1 | 5/2012 | Nomura et al. | |
| 2012/0131591 | A1* | 5/2012 | Moorthi | G06Q 10/06 |
| | | | | 718/104 |
| 2012/0246638 | A1* | 9/2012 | He | G06F 9/45558 |
| | | | | 718/1 |
| 2012/0284408 | A1* | 11/2012 | Dutta | G06F 9/5066 |
| | | | | 709/226 |

(56) References Cited

U.S. PATENT DOCUMENTS

| | | | |
|---|---|---|---|
| 2013/0007259 A1* | 1/2013 | Pacheco-Sanchez | G06F 11/3447 709/224 |
| 2013/0013730 A1* | 1/2013 | Li et al. | 709/217 |
| 2013/0042253 A1* | 2/2013 | Yagi | H04L 41/5019 718/104 |
| 2013/0054783 A1* | 2/2013 | Ge | H04L 43/04 709/224 |
| 2013/0204991 A1* | 8/2013 | Skjolsvold et al. | 709/223 |
| 2013/0211870 A1* | 8/2013 | Lawson | G06Q 10/06315 705/7.25 |
| 2013/0275589 A1* | 10/2013 | Karthikeyan | H04L 41/142 709/224 |
| 2013/0332109 A1* | 12/2013 | Luiset | H04L 63/1441 702/179 |
| 2013/0343281 A1* | 12/2013 | Bakker | H04W 36/023 370/328 |
| 2014/0040478 A1* | 2/2014 | Hsu et al. | 709/226 |
| 2014/0052413 A1* | 2/2014 | Murakami | H04L 41/142 702/187 |
| 2014/0303953 A1* | 10/2014 | Bates | G06Q 30/02 703/13 |
| 2014/0359092 A1* | 12/2014 | Middleton | G06F 9/541 709/221 |
| 2015/0120914 A1* | 4/2015 | Wada | H04L 43/0882 709/224 |
| 2017/0272973 A1* | 9/2017 | Denecheau | H04L 41/5003 |

OTHER PUBLICATIONS

Katja Gilly et al., "Predictive-adaptive algorithm for a cluster-based network web servers", IEEE Latin America Transactions, vol. 4, No. 1, Mar. 2006, pp. 62-68 (Includes an English Language Translation of the Abstract, 2 pages).

Michele Colajanni et al., "Analysis of Task Assignment Policies in Scalable Distributed Web-server Systems", IEEE Transactions on Parallel and Distributing Systems, vol. 9, No. 6, Jun. 1998, pp. 1-27.

Extended European Search Report dated Apr. 9, 2014, European Application No. 13180157.3 filed Aug. 13, 2013, pp. 1-19.

Ren, Xiaona, Lin, Rongheng, and Zou, Hua, "A Dynamic Load Balancing Strategy for Cloud Computing Platform Based on Exponential Smoothing Forecast", IEEE, 2011, pp. 220-224, Beijing University, China (5 pages).

Al-Ghamdi, M., Chester, A.P., and Jarvis, S.A., "Predictive and Dynamic Resource Allocation for Enterprise Applications", IEEE, 2010, pp. 2776-2783, Coventry, United Kingdom (8 pages).

Ardagna, Danilo, Casolari, Sara, and Panicucci, Barbara, "Flexible Distributed Capacity Allocation and Load Redirect Algorithms for Cloud Systems", 2011, Italy (11 pages).

* cited by examiner

SYSTEMS AND METHODS FOR LOAD BALANCING USING PREDICTIVE ROUTING

TECHNICAL FIELD

This disclosure is generally directed to systems and methods for load balancing using predictive routing. More specifically, this disclosure is directed to systems and methods for routing requests for information based on a prediction of a future state of one or more destination servers.

BACKGROUND

Companies often employ multiple destination servers on a network, each equally capable of responding to requests for information. Generally, a load balancer on the network may route such requests for information to one of these destination servers on the network based on any number of considerations. For example, if a client computer makes a request for information to which each of the destination servers on the network are capable of responding, the load balancer may route the request to the destination server that the load balancer considers to have the most availability.

The load balancer may receive measurements about the destination servers and determine how to route the requests based on these measurements. For example, probes distributed across the network may gather measurements about states at each destination server such as the traffic load, CPU load, response time, etc., and may send these measurements to the load balancer at regular intervals. The load balancer may then use these measurements to determine where to route requests for information.

Various delays inherent in the network, however, may cause these measurements to be stale by the time they are used by the load balancer. That is, the probe measurements (e.g., traffic load, CPU load, response time, etc.) may not accurately represent the present state of each of the destination servers, but instead may represent some past state that has changed since it was measured by the probe. For example, the measurements used by the load balancer may become stale due to the time between measurement intervals, the time it takes to propagate the measurement data from the destination server to the probe and from the probe to the load balancer, or any other delay that results in the reported measurements not reflecting the current state of the destination server.

Thus, conventional load balancing systems may not be able to properly, or at least optimally, route requests for information to two or more destination servers because the measurements used to determine how the requests are being routed may not reflect the current state of the destination servers. One way to reduce the problem of stale data is to make measurements at more frequent time intervals. This approach, however, may increase the load on the destination servers and may be computationally expensive for both the probes and the load balancers. Thus, another way is needed to effectively route requests using the load balancer that does not increase the load on the destination servers, while still ensuring that the measurement data being used by the load balancers is not stale.

SUMMARY

Disclosed embodiments are directed to methods and systems for predicting future measurement data at a destination server using past measurement data and then routing requests for information to the destination servers based on the predicted future measurement data.

In certain embodiments, a system for routing requests for information based on predictive data is disclosed that includes one or more memories storing instructions, and one or more processors capable of executing the instructions to (a) receive measurement data indicative of states of each of a plurality of destination servers and (b) generate predicted measurement data values for each of the plurality of destination servers based on the retrieved measurement data. The predicted measurement data values may represent predicted states of each of the destination servers at a time later than a time corresponding to the received measurement data. The one or more processors may also be configured to (c) receive requests for information from a client computer and then to (d) route the received requests for information to one of the plurality of destination servers based on the predicted measurement data value.

In some embodiments, the system may include or be included in a domain name server that receives a name resolution request and resolves the name resolution request by selectively returning an address of at least one of the destination servers based on the predicted measurement data value.

In other embodiments, the system may receive different types of measurement data, such as first measurement data indicative of first state criteria and second measurement data indicative of second state criteria, generate combined measurement data based on the different types of measurement data, and then use the combined measurement data to generate the predicted measurement data values for each of the plurality of destination servers. For example, the different state criteria may include one or more of a traffic load on the corresponding destination server, a processing load on the corresponding destination server, a response time of the corresponding destination server, a proximity to the client computer of the corresponding destination server, and a cost of operating the corresponding destination server.

In still other embodiments, a method for routing requests for information based on predictive data is disclosed. The method may include receiving measurement data indicative of states of each of a plurality of destination servers, and generating, by one or more processors, predicted measurement data values for each of the plurality of destination servers based on the retrieved measurement data. The predicted measurement data values may represent predicted states of each of the destination servers at a time later than a time corresponding to the received measurement data. The method may also include receiving requests for information from a client computer and routing the received requests for information to one of the plurality of destination servers based on the predicted measurement data value.

Consistent with yet other disclosed embodiments, computer-readable storage devices may store program instructions that are executable by one or more processors to implement any of the methods disclosed herein.

Additional objects and advantages of disclosed embodiments will be set forth in part in the description which follows, and in part will be obvious from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate several embodiments and together with the description, serve to explain the principles of the disclosed embodiments. In the drawings.

DESCRIPTION OF THE EMBODIMENTS

Disclosed embodiments provide systems and methods for predicting future measurement data at a destination server using past measurement data and routing requests for information to the destination servers based on the predicted future measurement data. Reference will now be made in detail to the exemplary embodiments, examples of which are illustrated in the accompanying drawings. Wherever possible, the same reference numbers will be used throughout the drawings to refer to the same or like parts.

Figure 1:
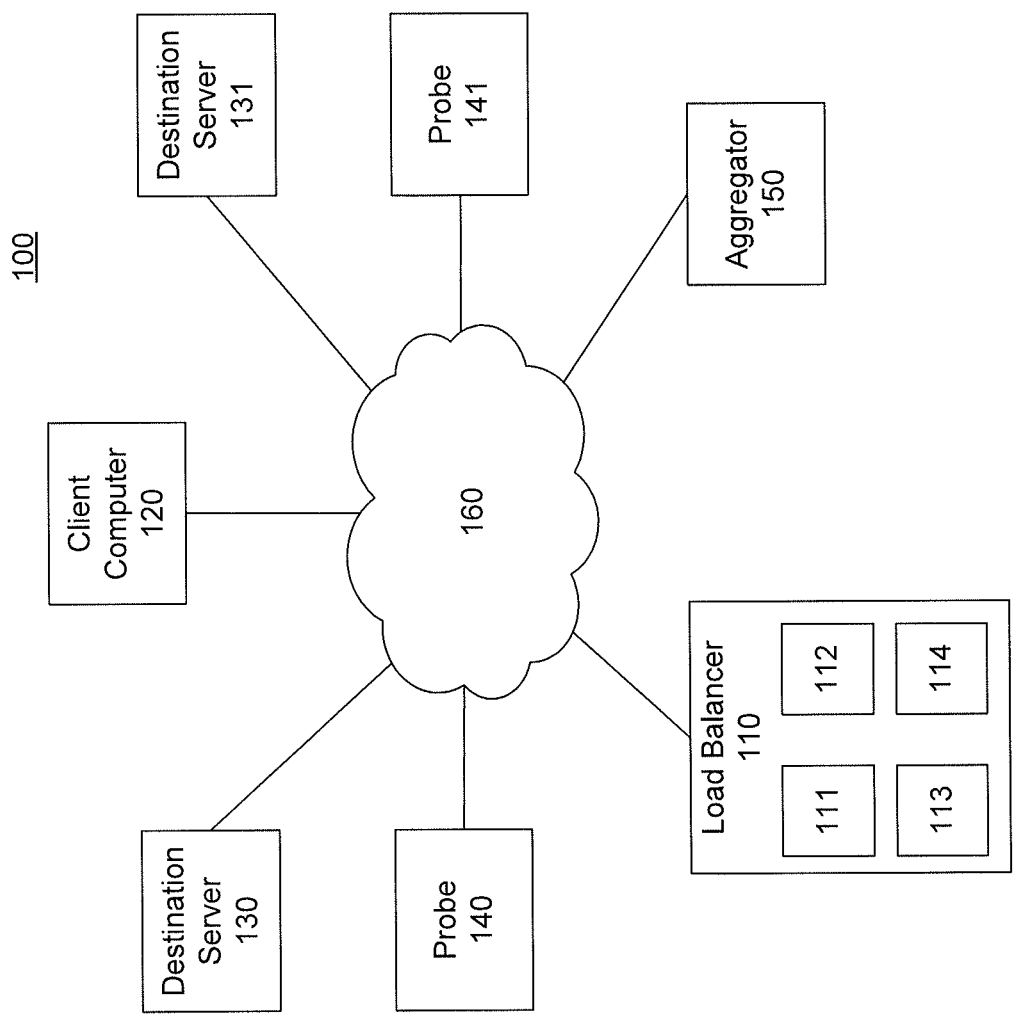
FIG. 1 is a diagram illustrating an exemplary system for routing requests for information based on predictive data, consistent with disclosed embodiments.

FIG. 1 is a diagram illustrating a system 100 for routing requests for information based on predictive data. As shown in FIG. 1, system 100 may include a load balancer 110, a client computer 120, destination servers 130 and 131, probes 140 and 141, and an aggregator 150 connected via a network 160. Network 160 may be any combination of wired and/or wireless networks, and may include, for example, any combination of local area networks (LANs), wide area networks (WANs), intranets, and the Internet.

Load balancer 110 may be configured to receive requests for information from client computer 120 and route the requests for information or otherwise redirect client computer 120 to one or more of destination servers 130 and 131 based on predicted data values that are used to predict states of destination servers 130 and 131, as discussed in greater detail below. Load balancer 110 may further be configured to generate the predictive data based on measurements of data values representing the current states of destination servers 130 and 131, also discussed in greater detail below.

In certain embodiments, load balancer 110 may include, or be included in, a name server, such as a domain name system (DNS) server. In these embodiments, client computer 120 may send a request for information to load balancer 110 in the form of a DNS request, such as a request for DNS address (A) records. For example, client computer 120 may send a DNS request for example.com. Destination servers 130 and 131 each may host content for the requested address, example.com, but may have different Internet protocol (IP) addresses. For example, destination server 130 may correspond to IP address 1.1.1.1 while destination server 131 may correspond to IP address 2.2.2.2. In response to receiving the DNS request from computer 120, load balancer 110 may return the A record of one or more of destination server 130 and destination server 131. Moreover, load balancer 110 may determine which A record (i.e., the A record of destination server 130 or the A record of destination server 131) to return based on predicted data values, implementing one or more of the processes discussed in greater detail below. In one embodiment, load balancer 110 may return the A records for both destination server 130 and destination server 131, but may determine an order or a preference ranking for each destination server based on the predicted data values, as discussed in greater detail below.

In other embodiments, load balancer 110 may include, or be included in, a server located, e.g., at an edge site of a content delivery network (CDN). In these embodiments, client computer 120 may send a request for information to load balancer 110 in the form of a content request on the CDN. The content may be stored at both destination server 130 and destination server 131, for example. In certain embodiments, load balancer 110 may respond to the content request with a redirection command that specifies one or more of destination servers 130 and 131. For example, load balancer 110 may respond to client computer 120 using a hyper text transfer protocol (HTTP) redirect that instructs computer 120 to request the content from destination 130. In other embodiments, load balancer 110 may tunnel the content request to computer 120 and act as a proxy between computer 120 and destination server 130 for all or part of the remaining transaction. In these embodiments, load balancer 110 may likewise determine which destination server 130 or 131 to forward the requests to (or tunnel the requests to) based on predicted data values, in accordance with one or more embodiments discussed below.

Those skilled in the art will appreciate that client computer 120 may include any type of computing device capable of sending requests for information via network 160. For example, client computer 120 may include any combination of desktop or laptop computer, cellular telephone, smartphone, tablet, etc., that may make DNS or content requests to load balancer 110. Moreover, while FIG. 1 illustrates only one client computer 120, those skilled in the art will appreciate that any number of client computers 120 may be included on network 160. For example, if network 160 includes the Internet, billions of client computers may be included in system 100.

Probes 140 and 141 may collect measurement data regarding the states of destination servers 130 and 131, respectively. For example, probes 140 and 141 may collect information related to one or more of a traffic load on the corresponding destination server, a processing load on the corresponding destination server, a response time of the corresponding destination server, a proximity to the client computer of the corresponding destination server, a cost of operating the corresponding destination server, etc. Of course, any other data measuring the states of destination servers 130 and 131 may be used.

Probes 140 and 141 may send the measurement data to aggregator 150, e.g., at predetermined intervals. Aggregator 150 may aggregate the measurement data received from probes 140 and 141 on network 160 and may send the aggregated measurement data to load balancer 110. In certain embodiments, aggregator 150 may not be included in system 100 and/or may be included in load balancer 110 and load balancer 110 may receive the individually measured measurement data from each of probes 140 and 141.

While FIG. 1 shows only one load balancer 110, system 100 may include multiple load balancers distributed across network 160. In certain embodiments, such as, for example where load balancer 110 is a DNS server, multiple load balancers may be distributed across different geographic locations. In one embodiment, the multiple load balancers may have anycasted and/or multicasted IP addresses, such that requests for information from client computers located in various locations are sent to different load balancers 110, e.g., based on proximity or other factors.

Likewise, while FIG. 1 only shows two destination servers 130 and 131 and two probes 140 and 141, any number of destination servers and probes may be included in system 100. For example, multiple destination servers may be included in system 100 and located in various geographic locations. Load balancer 110 may determine which destination server(s) to route the requests for information to, a percentage of requests to route to each destination server, and/or the order of the destination servers in which the requests should be routed, consistent with disclosed embodiments.

As shown in FIG. 1, load balancer 110 may include a processor 111, a storage 112, a memory 113, and one or more input/output ports 114. Processor 111 may include one or more processing devices, such as one or more microprocessors and/or embedded controllers, such as a microprocessor from the Pentium™ or Xeon™ family manufactured by Intel™, the Turion™ family manufactured by AMD™, any of various processors manufactured by Sun Microsystems, or any other type of processor. Storage 112 may include a volatile or non-volatile, magnetic, semiconductor, tape, optical, removable, nonremovable, or other type of computer-readable medium or computer-readable storage device. Storage 112 may store programs and/or other information, such as one or more predictive routing programs and any other information used to determine predicted measurement data regarding destination servers 130 and 131 and route received requests for information based on the predicted measurement data, as discussed in greater detail below. Memory 113 may include one or more storage devices configured to store information used by load balancer 110 to perform certain functions related to disclosed embodiments.

In one embodiment, memory 113 may include one or more short predictive routing programs or subprograms loaded from storage 112 or elsewhere that, when executed by processor 111, perform various procedures, operations, or processes consistent with the disclosed embodiments. For example, memory 113 may include one or more programs that enable load balancer 110 to, among other things, receive measurement data indicative of states of each of a plurality of destination servers, generate predicted measurement data values for each of the plurality of destination servers based on the retrieved measurement data, receive requests for information from a client computer, and route the received requests for information to one of the plurality of destination servers based on the predicted measurement data value.

Input/output ports 114 may enable load balancer 110 to send and receive data to and from other parts of system 100 consistent with disclosed embodiments. For example, load balancer 110 may receive, via input ports 114 requests for information and measurement data values and may output, via output ports 114, routing commands such as DNS responses, HTTP redirects, etc.

Figure 2:
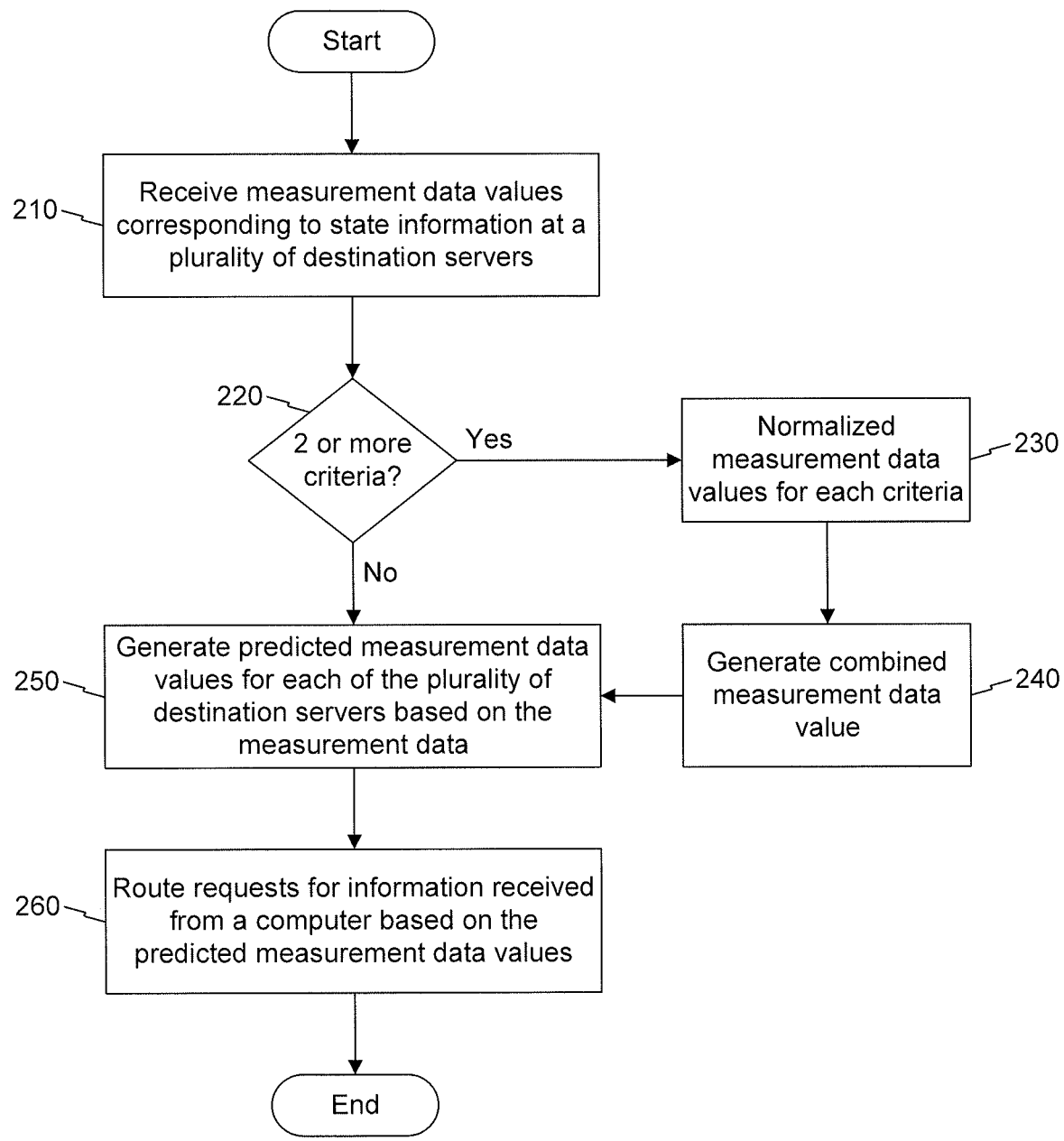
FIG. 2 is a flowchart illustrating an exemplary process that may be performed by the system of FIG. 1.

As discussed above, load balancer 110 may perform one or more predictive routing processes, e.g., by executing one or more programs stored in memory or elsewhere. FIG. 2 illustrates a flowchart of an exemplary predictive routing process that may be performed by load balancer 110.

As shown in FIG. 2, load balancer 110 may receive measurement data values corresponding to state information at a plurality of destination servers (step 210). For example, as explained above, load balancer 110 may receive measurement data values from aggregator 150 and/or from probes 140 and 141 regarding certain criteria, such as a traffic load on the corresponding destination server, a processing load on the corresponding destination server, a response time of the corresponding destination server, a proximity to the client computer of the corresponding destination server, a cost of operating the corresponding destination server, or any other type of criteria representing a state of the destination server. Load balancer 110 may receive the measurement data values, e.g., at predetermined intervals. Thus, while the process of FIG. 2 is shown as ending at step 260, the process may repeat at the predetermined intervals, e.g., each time the measurement data values are received.

Load balancer 110 may also determine the number of criteria being represented in the measurement data. In some embodiments, the measurement data may include measurements of two or more criteria. For example, the measurement data may correspond to both the traffic load at the corresponding destination server and a cost of operating the corresponding destination server, or any other combination of two or more criteria. Thus, at each predetermined interval, load balancer 110 may receive, as the measurement data for each destination server, a measurement data value regarding the traffic load and another measurement data value regarding the cost of operating the corresponding destination server.

If load balancer 110 determines that only one criterion is represented in the measurement data values (step 220, No), then load balancer 110 may generate predicted measurement data values from the single set of measurement data values, as described in greater detail below with regard to step 250.

If load balancer 110 determines that two or more criteria are included in the measurement data values (step 220, Yes), then load balancer 110 may further process the measurement data values, e.g., by normalizing the measurement data values for each criteria (step 230) to generate a combined measurement data value (step 240).

To illustrate these processing steps, consider the example where a first set of measurement data values are received that correspond to a cost C of a destination server transaction and a second set of measurement data values are received that correspond to a delay D of a transaction from source to destination. Table 1, shown below, illustrates two time series of measurement data values, one for cost C and another for delay D. As shown in Table 1, the cost C and delay D may not necessarily be measured in the same scale, and thus, if the measurement data values are merely added together, the criterion with the larger measurement data values (in this example, cost C) may have a greater effect on the routing decisions than the criterion with the smaller measurement data values.

TABLE 1

|        | Time t = 1 | t = 2 | t = 3 | t = 4 | t = 5 | Min | Max |
|--------|------------|-------|-------|-------|-------|-----|-----|
| Cost C | 75         | 80    | 85    | 90    | 90    | 75  | 90  |
| Cost D | 20         | 20    | 18    | 18    | 15    | 15  | 20  |
| Sum    | 95         | 100   | 103   | 108   | 105   |     |     |

Thus, in certain embodiments, load balancer 110 may normalize the measurement data values, e.g., as they are received from probes 140 and 141. Load balancer 110 may normalize the measurement data values according to any statistical function that can be used to normalize data. In one embodiment, load balancer 110 may implement a min-max normalization function such that each measurement data value is normalized according to the following equation:

$$X_N = \frac{(a + (x - A)) * (b - a)}{B - A} \quad (1)$$

where $x_N$ is the normalized measurement data value, x is the original measurement data value, a is the start of the new normalized range, b is the end of the new normalized range, A is the minimum value in a time series of measurement data values, and B is a maximum value in a time series of measurement data values. For example, at a time t, load balancer 110 may receive a cost measurement data value $x_c$ and a delay measurement data value $x_d$ and may normalize each measurement data value to generate a normalized cost measurement data value $x_{Nc}$ and a normalized delay measurement data value $x_{Nd}$, e.g., using equation (1) above.

After normalizing the measurement data values, load balancer 110 may generate a combined measurement data value $x_{comb}$. In certain embodiments, the combined measurement data value may be the sum of the normalized individual measurement data values. Continuing with the example where two measurement data values are received and normalized, the combined measurement data value may be determined to be:

$$x_{comb} = x_{Nc} + x_{Nd} \quad (2)$$

The combined measurement data value $x_{comb}$ may be determined in other ways, e.g., to be the average or weighted average of the normalized measurement data values. Continuing with the above example, the combined measurement data value may be determined to be:

$$x_{comb} = w_c * x_{Nc} + w_d * x_{Nd} \quad (3)$$

where $w_c$ is a weight associated with the cost measurement data values and $w_d$ is a weight associated with the delay measurement data values. In certain embodiments, load balancer 110 may enable a user to determine and configure the relative weights assigned to each of the measurement data value criteria.

After generating the combined measurement data values (step 240) or after determining that only one criterion is included in the measurement data (step 220), load balancer 110 may generate predicted measurement data values for each of the plurality of destination servers based on the measurement data values (or the combined measurement data values, if two or more criteria exist) (step 250).

The predicted measurement data values may be generated in a variety of ways. For example, in certain embodiments, load balancer 110 may generate the predicted measurement data values using one or more exponential smoothing methods. In one embodiment, load balancer 110 may implement a Holt-Winters exponential smoothing method in double or triple exponentiation form to generate the predicted measurement data values. For example, for a measurement data value $x_t$ measured at time t (or, if multiple measurement data value are collected representing multiple criteria, a combined measurement data value) in a series of measurement data values, load balancer 110 may generate a predicted measurement data value $x_{t+1}$ for a time t+1 using the following equations:

$$x_{t+1} = S_t + b_t \quad (4)$$

$$S_t = (\alpha * x_t) + (1 - \alpha)(S_{t-1} + b_{t-1}) \quad (5)$$

$$b_t = (\beta * (S_t - S_{t-1})) + (b_{t-1} * (1 - \beta)) \quad (6)$$

where $\alpha$ is a data smoothing factor that determines the speed at which the older values in the time series are dampened and is chosen such that $0 \leq \alpha \leq 1$ and $\beta$ is the trend smoothing factor and is chosen such that $0 \leq \beta \leq 1$. In certain embodiments, load balancer 110 may enable a user to choose the values of $\alpha$ and/or $\beta$.

Those skilled in the art will appreciate that if load balancer 110 generates predicted measurement data values according to equations (4)-(6) discussed above, then load balancer 110 may require initialization values for $S_t$ and $b_t$ (i.e., load balancer 110 may need to have beginning values of S and b). In certain embodiments, load balancer 110 may receive two or more sets of measurement data values prior to generating predicted data values and may determine the initialization values to be $S_1 = x_1$ and $b_1 = x_2 - x_1$.

While a Holt Winters method is discussed above as an example, those skilled in the art will understand that other methods for predicting the measurement data values could be used, such as machine learning, moving averages, or any other predictive algorithm.

After the predicted measurement data values are calculated, load balancer 110 may route requests for information that are received from a computer (e.g., client computer 120) based on the predicted measurement data values (step 250). Load balancer 110 may route the requests according to a variety of different methods, as discussed in greater detail below.

Figure 3:
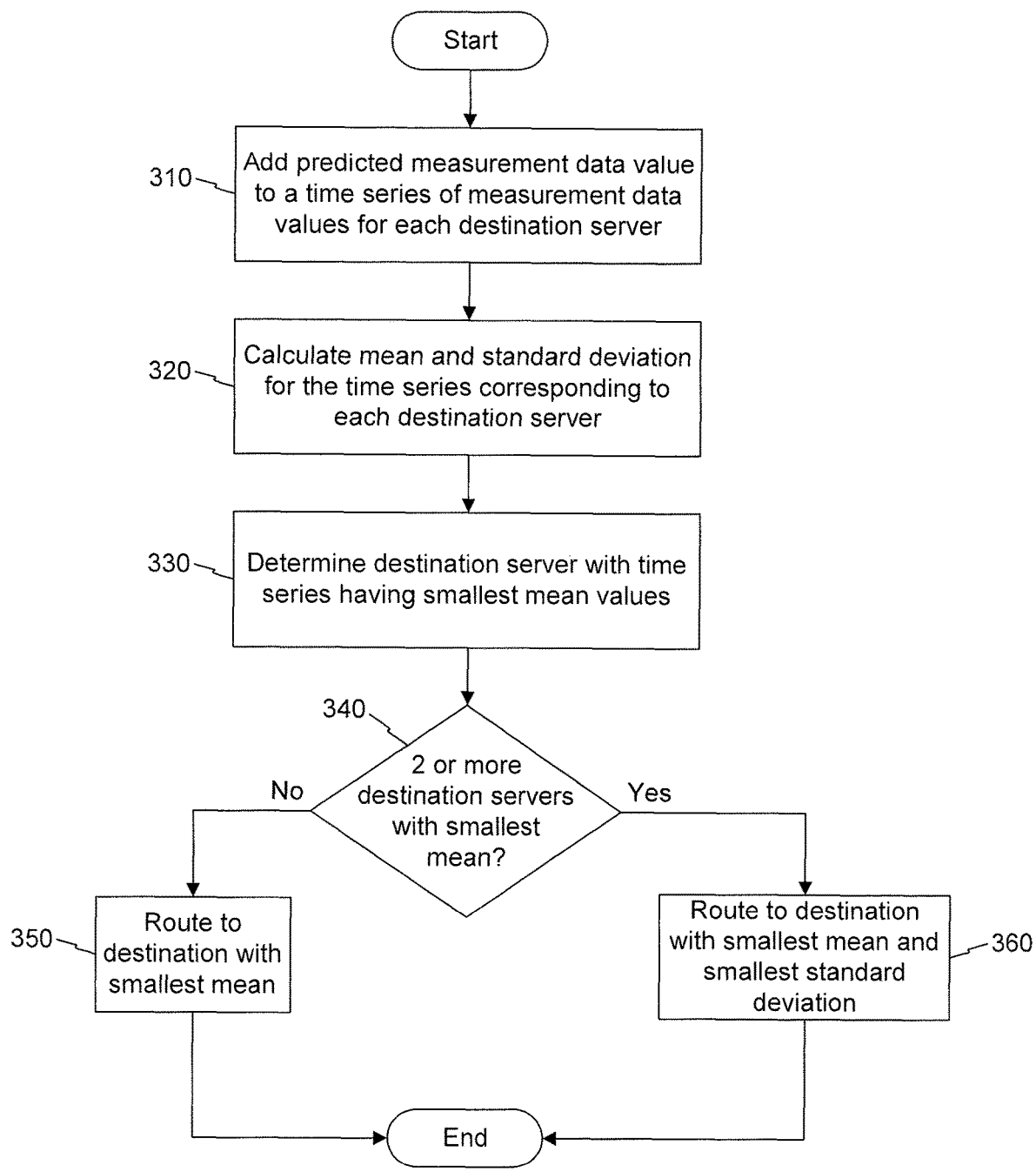
FIG. 3 is a flowchart illustrating another exemplary process that may be performed by the system of FIG. 1.

FIG. 3 illustrates an exemplary method that may be performed by load balancer 110 to route the requests for information. This method may be performed, e.g., as part of step 250 in the method of FIG. 2. According to the method of FIG. 3, load balancer 110 may generate, for each destination server, a time series using the measurement data values and the predicted measurement data values corresponding to that destination server, and may route the requests for information to the destination servers based on a statistical comparison of the time series for each destination server.

Load balancer 110 may generate a time series for each destination server by adding the predicted measurement data value to a time series of measurement data values for each destination server (step 310). For example, for destination server 130, load balancer 110 may have received measurement data values $x_{a1}$ and $x_{a2}$ at times t=1 and t=2, respectively. Load balancer 110 may calculate a predicted measurement data value $x_{a3}$, e.g., using one or more of the methods discussed above. Similarly, load balancer 110 may have received measurement data values $x_{b1}$ and $x_{b2}$ at times t=1 and t=2, respectively, for destination server 131 and may calculate a predicted measurement data value $x_{b3}$. At step 310, load balancer 110 may generate a time series $\{x_{a1}, x_{a2}, x_{a3}\}$ for destination sever 130 and a time series $\{x_{b1}, x_{b2}, x_{b3}\}$ for destination server 131. While a time series of only three times is shown for exemplary purposes, load balancer 110 may generate time series of any length.

Load balancer 110 may also calculate the mean and standard deviation of the time series for each destination server (step 320), and may determine the destination server with the time series having the smallest mean (step 330). If load balancer 110 determines that only one destination server has the smallest mean (step 340, N), then load balancer 110 may route the received requests for information to the destination server having the smallest mean (step 350).

If load balancer 110 determines that two or more destination servers have the smallest mean (step 340, Y), then load balancer 110 may route the received requests for information to the destination server, chosen from the destination servers having the time series with the same smallest mean, that has the time series with the smallest standard deviation (step 360).

Figure 4:
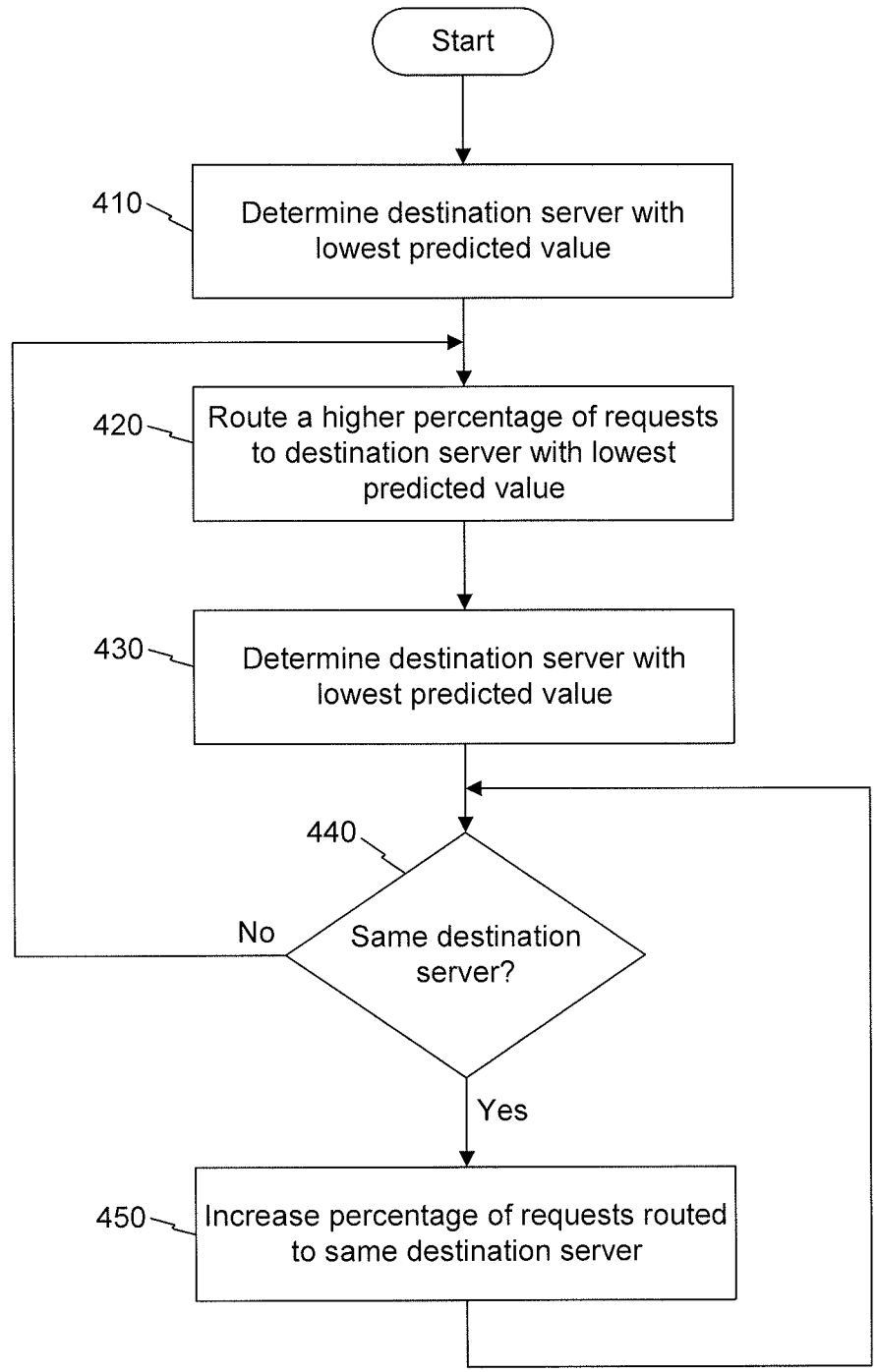
FIG. 4 is a flowchart illustrating yet another exemplary process that may be performed by the system of FIG. 1.

FIG. 4 illustrates another exemplary method that may be performed by load balancer 110 to route the requests for information. This method may be performed, e.g., as part of step 250 in the method of FIG. 2. According to the method of FIG. 4, load balancer 110 may route the received requests for information to multiple destination servers such that a higher percentage of received requests for information are routed to the destination server with the lowest predicted measurement data value.

For example, load balancer 110 may determine the destination server with the lowest predicted measurement data value (step 410). As discussed above, load balancer 110 may calculate predicted measurement data values for each of the destination servers. Thus, at step 410, load balancer 110 may compare the predicted measurement data values of each destination server for a particular time interval to determine the destination sever with the lowest predicted measurement data value.

Load balancer 110 may route a higher percentage of requests for information to the destination server having the lowest predicted measurement data value (step 420). In certain embodiments, the percentage may be set to a constant value. For example, if three destination servers exist, then load balancer 110 may route y % of the requests to the destination server having the lowest predicted measurement data value and z % of the requests to each of the remaining destination servers, such that y>z. Load balancer 110 may enable a user to configure the relationship between y and z. Moreover, in other embodiments, the relationship between y and z may be proportional to the relationship between the lowest predicted measurement data value and one or more of the remaining predicted measurement data values. For example, if the lowest predicted measurement data value is half the amount of the next lowest predicted measurement data value, then y may be twice as much as z. Of course, other methods may be used to determine the relationship between y and z.

After step 420, load balancer 110 may again recalculate the predicated measurement data values for each destination server and may again determine the destination server with the lowest predicted measurement data value (step 430). For example, because at step 420 the load balancer 110 routed a greater percentage of requests to the destination server with the lowest predicted value, the predicted measurement data values of each of the destination servers may change and the destination server that previously had the lowest predicted measurement data value may not currently have the lowest predicted measurement data value.

If the destination server with the lowest predicted value at step 430 is the same as the destination server with the lowest predicted value at step 410 (step 440, Yes), then load balancer 110 may increase the percentage of requests routed to the same destination server (step 450). Assume, for example, that the measurement data value applies to a single criterion of delay D. If at step 440, load balancer 110 determines that the same server that previously had the lowest delay still has the lowest delay, even after a higher percentage of requests were routed to that server in step 420, then load balancer 110 may assume that this destination server can handle an even higher number of requests for information and may thus further increase the percentage of requests sent to this server. The amount by which the percentage increases may be set to a constant value, may be configured by a user, and/or may be determined in any other manner.

If load balancer 110 determines that the destination server with the lowest predicted value at step 430 is different than the destination server with the lowest predicted value at step 410 (step 440, No), then load balancer 110 may return to step 420 where load balancer 110 may route a higher percentage of requests to the destination server that now has the lowest predicted measurement data value. For example, the difference in percentages of requests that are routed to the different destination servers may be determined as discussed above with regard to step 420.

Figure 5:
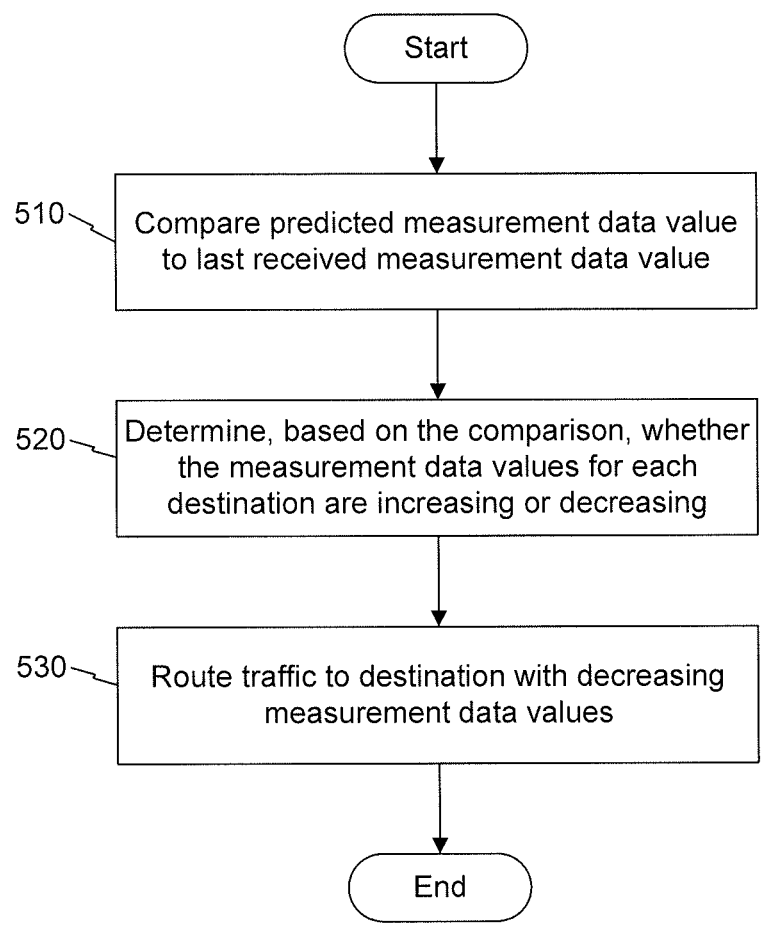
FIG. 5 is a flowchart illustrating still another exemplary process that may be performed by the system of FIG. 1.

FIG. 5 illustrates yet another exemplary method that may be performed by load balancer 110 to route the requests for information.

Load balancer 110 may compare the predicted measurement data value to the last received measurement data value (step 510). Based on the comparison, load balancer 110 may determine whether the measurement data values for each destination server are increasing or decreasing (step 520). For example, if the predicted measurement data value is less than the last received measurement data value for a particular destination server, then load balancer 110 may determine that the measurement data values for that destination server are decreasing. On the other hand, if the predicted measurement data value is greater than the last received measurement data value for a particular destination server, then load balancer 110 may determine that the measurement data values for that destination server are increasing.

Load balancer 110 may route traffic to one or more of the destination servers with decreasing measurement data values (step 530). Load balancer 110 may do this in a variety of ways. In one embodiment, load balancer 110 may route all of the received requests for information to the server that is decreasing by the greatest amount (e.g., the server that has a predicted measurement data value that is less than the corresponding last received measurement data value by the largest amount). In another embodiment, load balancer 110 may route the received requests for information to all servers that have decreasing measurement data values of any amount, e.g., by routing the requests equally among those servers, or by routing the requests proportionally to the amount by which the measurement data values are decreasing. In yet another embodiment, load balancer 110 may determine that the predicted measurement data values are not decreasing for any of the destination servers. In this case, load balancer 110 may route the requests for information to the least increasing destination server.

Of course, load balancer 110 may route the requests for information based on the predicted measurement data values in other ways. For example, in one embodiment, load balancer 110 may compare the predicted measurement data value of each destination server and may route all of the requests for information to the destination server with the lowest predicted measurement data value. In another embodiment, load balancer 110 may route percentages of the requests for information to the destination servers, such that the percentages are proportional to the measurement data values.

In the above exemplary embodiments, an assumption was made regarding the measurement data values that a lower measurement data value represents a better state of the corresponding destination server. For example, if two criteria being used are delay and processor usage, then lower delay and processor usage measurement data values correspond to a better state than higher delay and processor usage measurement data values. Those skilled in the art will appreciate, however, that in certain embodiments, the measurement data values may be adjusted so that higher measurement data values correspond to a better state of the corresponding destination server. Thus, in these embodiments, routing decisions, as described in FIGS. 3-5, may be changed accordingly. For example, in FIG. 3, the requests for information may be routed to the destination server with the largest mean. Likewise, in FIG. 4, a higher percentage of the requests for information may be routed to the destination server with the highest predicted value.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation includes software, but the disclosed embodiments may be implemented as a combination of hardware and software or in firmware. Examples of hardware include computing or processing systems, including personal computers, servers, laptops, mainframes, microprocessors, and the like. Additionally, although disclosed aspects are described as being stored in a memory on a computer, one skilled in the art will appreciate that these aspects can also be stored on other types of computer-readable storage media, such as secondary storage devices, like hard disks, floppy disks, a CD-ROM, USB media, DVD, or other forms of RAM or ROM.

Computer programs based on the written description and disclosed methods are within the skill of an experienced developer. The various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), XML, Java, C++, JavaScript, HTML, HTML/AJAX, Flex, Silverlight, or any other now known or later created programming language. One or more of such software sections or modules can be integrated into a computer system or existing browser software.

Other embodiments will be apparent to those skilled in the art from consideration of the specification and practice of the embodiments disclosed herein. The recitations in the claims are to be interpreted broadly based on the language employed in the claims and not limited to examples described in the present specification or during the prosecution of the application, which examples are to be construed non-exclusive. Further, the steps of the disclosed methods may be modified in any manner, including by reordering steps and/or inserting or deleting steps. It is intended, therefore, that the specification and examples be considered as exemplary only, with a true scope and spirit being indicated by the following claims and their full scope equivalents.

What is claimed is:

1. A system for routing requests for information based on predictive data, the system comprising:
    one or more memories storing instructions; and
    one or more processors capable of executing the instructions to:
        receive, for each of a plurality of destination servers, corresponding measurement data values that indicate an operational state of the destination server at a first time;
        generate, based on the corresponding measurement data values for each of the plurality of destination servers, corresponding predicted data values for the destination server that predict the operational state of the destination server at a second time later than the first time;
        receive a first set of requests for information from one or more client computers;
        for each destination server included in the plurality of destination servers, combine the corresponding measurement data values and the corresponding predicted data values to generate a combined time series associated with a time interval between the first time and the second time;
        for each destination server included in the plurality of destination servers, calculate, based on the combined time series corresponding to the destination server in the plurality of destination servers, a corresponding predicted state change in the operational state of the destination server from the first time to the second time;
        select, based on a plurality of combined time series that includes the combined time series corresponding to each destination server of the plurality of destination servers, a set of selected destination servers for which the corresponding predicted state change is predicted to improve from the first time to the second time;
        route the first set of requests for information to a first destination server included in the set of selected destination servers;
        update a first combined time series corresponding to the first destination server based on updated measurement data values and updated predicted data values determined in response to the first destination server processing the first set of requests;
        receive a second set of requests for information from the one or more client computers; and
        route the second set of requests for information to a second destination server corresponding to a second combined time series having a lower mean value than the updated first combined time series.

2. The system of claim 1, the one or more processors being further configured to:
    receive first and second measurement data values that respectively indicate first and second state criteria in the operational state of each of the plurality of destination servers at the first time;
    generate, based on the first and second measurement data values for each destination server of the plurality of destination servers, corresponding combined measurement data values for each destination server of the plurality of destination servers; and
    generate, for each destination server of the plurality of destination servers, the corresponding predicted data values based on the corresponding combined measurement data values for the destination server.

3. The system of claim 2, wherein the first and second state criteria each includes one selected from the group consisting of:
    a traffic load on the corresponding destination server and a processing load on the corresponding destination server.

4. The system of claim 2, the one or more processors being further configured to:
    normalize the first and the second measurement data values; and generate the combined measurement data values using the normalized first and second data values.

5. The system of claim 4, the one or more processors being further configured to:
   generate the combined measurement data values as a weighted average of the normalized first and second data values.

6. The system of claim 1, the one or more processors being further configured to:
   generate, for each of the plurality of destination servers, the corresponding predicted data values using an exponential smoothing technique.

7. The system of claim 1, the one or more processors being further configured to:
   calculate, for each combined time series, a corresponding mean value of the measurement data values and predicted data values in the combined time series,
   wherein the first set of requests for information is routed to the first destination server based on a corresponding first combined time series having a smallest mean value among the plurality of combined time series.

8. The system of claim 7, the one or more processors being further configured to:
   calculate, for each combined time series, a corresponding standard deviation of the measurement data values and predicted data values in the combined time series,
   wherein, when two or more destination servers correspond to separate combined time series that both have a smallest mean value among the plurality of combined time series, the first set of requests for information is routed to the first destination server the corresponding first combined time series having a smaller standard deviation than a corresponding second combined time series.

9. The system of claim 1, wherein:
   the first set of requests for information is routed to the first destination server and at least a second server included in the plurality of destination servers,
   the first destination server and at least the second destination server receive portions of the first set of requests for information based on a percentage allocation,
   the percentage allocation allocates:
      a first portion of the first set of requests to a first determined destination server with a lowest set of predicted data values, and
      a second portion of the first set of requests to a second determined destination server with a highest set of predicted data values, and
   the first portion percentage is higher than the second portion.

10. The system of claim 1, wherein selecting the set of selected destination servers comprises:
    comparing, for a specific time interval associated with the second time, the corresponding predicted data values of each destination server of the plurality of destination servers time; and
    selecting the set of selected destination servers, wherein the set of selected destination servers have corresponding combined time series that have lowest set predicted data values among the plurality of combined time series.

11. A computer-implemented method for routing requests for information based on predictive data, the computer-implemented method comprising:
    receiving, for each of a plurality of destination servers, corresponding measurement data values that indicate an operational state of the destination server at a first time;
    generating, by one or more processors based on the corresponding measurement data values for each of the plurality of destination servers, corresponding predicted data values for the destination server that predict the operational state of the destination server at a second time later than the first time;
    receiving a first set of requests for information from one or more client computers;
    for each destination server included in the plurality of destination servers, combine the corresponding measurement data values and the corresponding predicted data values to generate a combined time series associated with a time interval between the first time and the second time;
    for each destination server included in the plurality of destination servers, calculating, based on the combined time series corresponding to the destination server in the plurality of destination servers, a corresponding predicted state change in the operational state of the destination server from the first time to the second time;
    selecting, based on a plurality of combined time series that includes the combined time series corresponding to each destination server of the plurality of destination servers, a set of selected destination servers for which the corresponding predicted state change is predicted to improve from the first time to the second time;
    routing the first set of requests for information to a first destination server included in the set of selected destination servers;
    updating a first combined time series corresponding to the first destination server based on updated measurement data values and updated predicted data values determined in response to the first destination server processing the first set of requests;
    receiving a second set of requests for information from the one or more client computers; and
    routing the second set of requests for information to a second destination server corresponding to a second combined time series having a lower mean value than the updated first combined time series.

12. The computer-implemented method of claim 11, further comprising:
    receiving first and second measurement data values that respectively indicate first and second state criteria in the operational state of each of the plurality of destination servers at the first time;
    generating, based on the first and second measurement data values for each destination server of the plurality of destination servers, corresponding combined measurement data values for each destination server of the plurality of destination servers; and
    generating, for each destination server of the plurality of destination servers, the corresponding predicted data values based on the corresponding combined measurement data values for the destination server.

13. The computer-implemented method of claim 12, wherein the first and second state criteria each includes one selected from the group consisting of:
    a traffic load on the corresponding destination server; and
    a processing load on the corresponding destination server.

14. The computer-implemented method of claim 12, further comprising:

normalizing the first and the second measurement data values; and generating the combined measurement data values using the normalized first and second data values.

15. The computer-implemented method of claim 14, further comprising:

generating the combined measurement data values as a weighted average of the normalized first and second data values.

16. The computer-implemented method of claim 11, further comprising:

generating, for each of the plurality of destination servers, the corresponding predicted data values using an exponential smoothing technique, generating the predicted measurement data values for each of the plurality of destination servers using an exponential smoothing technique.

17. The computer-implemented method of claim 11, further comprising:

calculating, for each combined time series, a corresponding mean value of the measurement data values and predicted data values in the combined time series, wherein the first set of requests for information is routed to the first destination server based on a corresponding first combined time series having a smallest mean value among the plurality of combined time series.

18. The computer-implemented method of claim 17, further comprising:

calculating, for each combined time series, a corresponding standard deviation of the measurement data values and predicted data values in the combined time series, wherein, when two or more destination servers correspond to separate combined time series that both have a smallest mean value among the plurality of combined time series, the first set of requests for information is routed to the first destination server the corresponding first combined time series having a smaller standard deviation than a corresponding second combined time series.

19. The computer-implemented method of claim 11, wherein:

the first set of requests for information is routed to the first destination server and at least a second server included in the plurality of destination servers, the first destination server and at least the second destination server receive portions of the first set of requests for information based on a percentage allocation, wherein the percentage allocation allocates:
 a first portion of the first set of requests to a first determined destination server with a lowest set of predicted data values, and
 a second portion of the first set of requests to a second determined destination server with a highest set of predicted data values, and portion is higher than the second portion.

20. One or more non-transitory computer readable media including instructions for routing requests for information based on predictive data that, when executed by one or more processors, cause the one or more processors to:

receive, for each of a plurality of destination servers, corresponding measurement data values that indicate an operational state of the destination server at a first time;

generate, based on the corresponding measurement data values for each of the plurality of destination servers, corresponding predicted data values for the destination server that predict the operational state of the destination server at a second time later than the first time;

receive a first set of requests for information from one or more client computers;

for each destination server included in a plurality of destination servers, combine the corresponding measurement data values and the corresponding predicted data values to generate a combined time series associated with a time interval between the first time and the second time;

for each destination server included in the plurality of destination servers, calculate, based on the combined time series corresponding to the destination server in the plurality of destination servers, a corresponding predicted state change in the operational state of the destination server from the first time to the second time;

select, based on a plurality of combined time series that includes the combined time series corresponding to each destination server of the plurality of destination servers, a set of selected destination servers for which the corresponding predicted state change is predicted to improve from the first time to the second time;

route the first set of requests for information to a first destination server included in the set of selected destination servers;

update a first combined time series corresponding to the first destination server based on updated measurement data values and updated predicted data values determined in response to the first destination server processing the first set of requests;

receive a second set of requests for information from the one or more client computers; and route the second set of requests for information to a second destination server corresponding to a second combined time series having a lower mean value than the updated first combined time series.

21. The one or more non-transitory computer readable media of claim 20, wherein the instructions, when executed by the one or more processors, further cause the one or more processors to:

receive first and second measurement data values that respectively indicate first and second state criteria in the operational state of each of the plurality of destination servers at the first time;

generate, based on the first and second measurement data values for each destination server of the plurality of destination servers, corresponding combined measurement data values for each destination server of the plurality of destination servers; and generate, for each destination server of the plurality of destination servers, the corresponding predicted data values based on the corresponding combined measurement data values for the destination server.

22. The one or more non-transitory computer readable media of claim 21, wherein the instructions, when executed by the one or more processors, further cause the one or more processors to:

normalize the first and the second measurement data values; and generate the combined measurement data values using the normalized first and second data values.

* * * * *